(12) United States Patent
Xiong et al.

(10) Patent No.: US 11,649,955 B2
(45) Date of Patent: May 16, 2023

(54) PLANT LIGHT SUPPLEMENTING LAMP

(71) Applicant: CHI NA Technology (HANGZHOU) Co., Ltd., Hangzhou (CN)

(72) Inventors: Yuanhong Xiong, Hangzhou (CN); Zihao Xiong, Hangzhou (CN); Zimo Xiong, Hangzhou (CN)

(73) Assignee: CHI NA TECHNOLOGY (HANGZHOU) CO., LTD., Hangzhou (CN)

(*) Notice: Subject to any disclaimer, the term of this patent is extended or adjusted under 35 U.S.C. 154(b) by 105 days.

(21) Appl. No.: 17/384,988

(22) Filed: Jul. 26, 2021

(65) Prior Publication Data
US 2022/0095550 A1 Mar. 31, 2022

(30) Foreign Application Priority Data
Sep. 28, 2020 (CN) .......................... 202011038583.9

(51) Int. Cl.
| F21V 23/02 | (2006.01) |
| F21V 21/088 | (2006.01) |
| F21V 23/06 | (2006.01) |
| F21V 23/00 | (2015.01) |

(52) U.S. Cl.
CPC .......... *F21V 23/026* (2013.01); *F21V 21/088* (2013.01); *F21V 23/008* (2013.01); *F21V 23/06* (2013.01)

(58) Field of Classification Search
CPC .. F21S 8/00; F21V 17/16; F21V 21/00; F21V 21/088; F21V 23/008; F21V 23/026; F21V 23/06; F21V 31/005; H01R 33/94; A01G 7/045
See application file for complete search history.

(56) References Cited

U.S. PATENT DOCUMENTS

| 2013/0002164 | A1* | 1/2013 | Galluccio | ............. F21V 19/008 |
| | | | | 362/249.02 |
| 2013/0003362 | A1* | 1/2013 | Kang | ...................... F21V 29/83 |
| | | | | 362/185 |
| 2018/0249559 | A1* | 8/2018 | Sakurai | ................... F21V 21/30 |
| 2019/0104585 | A1* | 4/2019 | Albrechtsen | .......... F21V 23/007 |
| 2022/0018528 | A1* | 1/2022 | Chen | ....................... F21V 23/04 |
| 2022/0049825 | A1* | 2/2022 | Cai | ....................... F21V 7/0016 |

FOREIGN PATENT DOCUMENTS

| CN | 209084502 | * | 7/2019 | ............. F21V 23/06 |
| WO | WO 2014/059567 | * | 4/2014 | ................ F21V 7/05 |

\* cited by examiner

*Primary Examiner* — Zheng Song
(74) *Attorney, Agent, or Firm* — Bayramoglu Law Offices LLC (57) ABSTRACT

A plant light supplementing lamp is provided. The plant light supplementing lamp includes an electronic ballast, a mounting bracket, a lamp support, lamp holders and a lamp shade; a number of the lamp holders is two, the lamp holders are respectively located at a top and a bottom of the lamp support, limiting plates are provided on a front side of a top of the electronic ballast, an adapter is clamped on an inner side of the limiting plate, sliding grooves are provided in left and right side surfaces of the adapter, and fixing grooves are provided in corners of the left and right side surfaces of the adapter.

10 Claims, 6 Drawing Sheets

PLANT LIGHT SUPPLEMENTING LAMP

CROSS REFERENCE TO THE RELATED APPLICATIONS

This application is based upon and claims priority to Chinese Patent Application No. 202011038583.9 filed on Sep. 28, 2020, the entire contents of which are incorporated herein by reference.

TECHNICAL FIELD

The present invention relates to the technical field of plant cultivation apparatuses, in particular to a plant light supplementing lamp.

BACKGROUND

A pant light supplementing lamp is an apparatus used in the process of plant cultivation for providing artificial supplementary light for indoor and greenhouse plants by artificially simulating sunlight, so as to realize the photosynthesis required by plant growth in the room, control the flowering cycle of plants and accelerate the growth of plants.

The existing plant light supporting lamp is generally in an integral structure, that is, a lamp shade and an electronic ballast at the bottom are fixed by adopting bolts. The existing plant light supporting lamp is generally in an integral structure, that is, a lamp shade and an electronic ballast are fixed by adopting non-detachable screws. In the process of use, no matter the electronic ballast or the lamp shade fails, the consumer or dealer cannot repair or replace it, and it needs to be returned to the factory for repairing or replacing accessories by professional apparatuses and personnel. Moreover, in regard to the existing plant light supplementing lamp, a power supply in the electronic ballast is generally electrically connected with a lamp outside the electronic ballast through an external cable. The external cable is easily squeezed, bent and corroded by high temperature and even rainwater in the process of long-time use, resulting in that the cable fails and must be returned to the original factory for replacement. An electronic ballast housing of the existing plant light supplementing lamp consists of four accessories, which realizes a waterproof effect by locking four covers with screws. A circuit board in the ballast of the existing plant light supplementing lamps is covered with resin glue, through which the heat of the circuit board is transferred to the ballast housing to achieve heat dissipation. The waterproof effect of this design is very poor, the dismounting cost is very high, the heat dissipation effect of the resin glue is very poor, and the circuit board cannot be replaced and repaired.

SUMMARY

(1) Technical Problem to be Solved

In view of the defects of the prior art, the present invention provides a plant light supplementing lamp, which has the advantages that a quick-dismount combined mechanism can be used to conveniently mount and dismount a lamp shade and an electronic ballast to improve the repair efficiency and an internal contact-type power supply structure can prevent an external cable from being damaged to prolong the service life, thus solving the problem described in the background.

(II) Technical Solution

In order to achieve the purposes that the quick-dismount combined mechanism can be used to conveniently mount and dismount the lamp shade and the electronic ballast to improve the repair efficiency and the internal contact-type power supply structure can prevent the external cable from being damaged to prolong the service life, the present invention adopts the following technical solution: a plant light supplementing lamp includes an electronic ballast and a lamp support, an adapter connected with the electronic ballast is provided above the electronic ballast, a top of the adapter is movably clamped with a bottom of the lamp support, a fixing hole is provided in a rear end of a side surface of the adapter, an elastic member penetrating through the fixing hole is provided in the fixing hole, a stop pin is fixedly mounted at the end, far away from the adapter, of the elastic member, the total length of the elastic member and the stop pin is greater than the depth of the fixing hole, a limiting hole is provided in left and right side surfaces of the bottom of the lamp support, the stop pin is provided in the limiting hole in a penetrating manner, guide blocks extending from front to rear are respectively provided on left and right inner side surfaces of the bottom of the lamp support, sliding grooves extending from front to rear are provided in left and right outer side surfaces of the adapter, and the guide blocks are located in the sliding grooves. The adapter and the lamp support are positioned by inserting the elastic member and the stop pin into the limiting hole, thus improving the stability of connection between the lamp support and the adapter, and facilitating the dismounting and mounting of the lamp support on the adapter at the same time; the guide blocks are located in the sliding grooves when the lamp support is mounted on the adapter, thus further improving the strength of connection between the lamp support and the adapter; the lamp support can move stably during dismounting and mounting through the guide blocks which move forwards and backwards in the sliding grooves, thus avoiding the damage caused by shaking during dismounting and mounting.

As a preferable embodiment, the thickness of the guide blocks is the same as the height of the sliding grooves, the length of the guide blocks is adapted to the length of the sliding grooves, the diameter of the limiting hole is the same the diameter of the stop pin, and the limiting hole penetrates through inner and outer side surfaces of the bottom of the lamp support. The connection between the lamp support and the adapter is facilitated, and the stability of connection between the lamp support and the adapter is improved at the same time.

As a preferable embodiment, limiting plates extending from front to rear are provided on an upper end surface of the electronic ballast, the limiting plates are provided perpendicular to the upper end surface of the electronic ballast, the number of the limiting plates is two, and the limiting plates are symmetrically distributed in a left-right direction on the upper end surface of the electronic ballast. The limiting plate is used to fix the position of the adapter on the electronic ballast, thus preventing the adapter from moving leftwards and rightwards on the electronic ballast.

As a preferable embodiment, a T-shaped clamping block is fixedly mounted on the inner side surface of each limiting plate, the material of the T-shaped clamping block is the same as the material of the limiting plate, and clamping grooves adapted to the T-shaped clamping blocks are respectively provided in left and right side surfaces of the adapter. The adapter is mounted on the electronic ballast, and the T-shaped clamping blocks are clamped into the clamping grooves, thus improving the stability of the adapter on the electronic ballast and preventing the adapter from moving forwards and backwards on the electronic ballast.

As a preferable embodiment, the clamping grooves are in interference fit with the T-shaped clamping blocks, and the clamping grooves penetrate through an upper end surface and a lower end surface of the adapter from top to bottom. It facilitates the T-shaped clamping blocks to move upwards and downwards in the clamping grooves, so as to facilitate the dismounting or mounting of the adapter and the electronic ballast. The clamping grooves are in interference fit with the T-shaped clamping blocks, thus further improving the strength of connection between the adapter and the electronic ballast, and preventing the adapter from falling off the electronic ballast when it works or the working place is changed.

As a preferable embodiment, the sliding grooves are located at a middle-upper position of the side surface of the adapter, upper end surfaces of the limiting plates are in flush with upper end surfaces of the T-shaped clamping blocks, the sliding grooves are located above the limiting plates, and rear ends of the sliding grooves penetrate to a rear side surface of the adapter. The connection between the sliding grooves and the guide blocks does not interfere with the connection between the T-shaped clamping blocks and the clamping grooves, thus realizing the sequential connection of the electronic ballast, the adapter and the lamp holder from bottom to top, simplifying the connection structure, and facilitating the dismounting and mounting of the electronic ballast, the adapter and the lamp holder.

As a preferable embodiment, limiting slots are provided in a bottom of a back surface of the adapter, the number of the limiting slots is two, the limiting slots are symmetrically distributed in a left-right direction in a rear side surface of the adapter, a limiting rod is fixedly provided on an inner rear side surface of a lower end of the lamp support, and the limiting rod is adapted to the limiting slots and is provided in the limiting slots in a penetrating manner. When the adapter and the lamp support are mounted, they are further fixed through the limiting rod and the limiting slots, thus preventing the lamp support from moving leftwards and rightwards on the adapter, improving the tightness of the lamp support mounted on the adapter, and improving the strength of connection between the adapter and the lamp support.

As a preferable embodiment, a first electrical module is provided in a lower end of the lamp support, a male wiring terminal is fixedly mounted at an output end of the first electrical module, a guide bar is provided below the male wiring terminal, a wiring outlet is provided in the bottom of the lamp support, the wiring outlet penetrates through the bottom of the lamp support, a second electrical module mounted in the adapter is provided in the adapter, a female wiring terminal adapted to the male wiring terminal is fixedly mounted at an output end of the second electrical module, and a guide groove adapted to the guide bar is provided below the female wiring terminal. In the process of mounting the lamp support to the adapter, the first electrical module is gradually connected with the second electrical module, and the male wiring terminal is connected with the female wiring terminal. In the process that the lamp support moves forwards and backwards, the forward and backward movement of the lamp support, the guide bar synchronously moves forwards and backwards in the guide groove, thus facilitating the connection and disconnection of the male wiring terminal and the female wiring terminal, and improving the movement stability of the second electrical module.

As a preferable embodiment, the plant light supplementing lamp further includes lamp holders connected with the lamp support and a lamp shade connected with the lamp holders, the lamp holders are provided in the lamp support, the number of the lamp holders is two, and the two lamp holders are respectively located at a top and a bottom of the lamp shade. The mounting strength of the lamp shade is improved.

As a preferable embodiment, sidewalls of the electronic ballast consist of four vertical plates which form an integral structure, a U-shaped radiating fin for mounting electronic devices is provided in the electronic ballast, the U-shaped radiating fin is fixedly mounted in the electronic ballast, and an outer side surface of the U-shaped radiating fin is in close contact with an inner side surface of the electronic ballast. The electronic ballast is formed by adopting integral injection molding, thus improving the sealing performance and the waterproof performance of the electronic ballast; the U-shaped radiating fin dissipates the heat emitted by the electronic devices on the U-shaped electronic ballast and then the sidewalls of the electronic ballast dissipate the heat on the U-shaped radiating fin, thus increasing the heat dissipation area and improving the heat dissipation effect.

(III) Beneficial Effects

Compared with the prior art, the present invention has the following beneficial effects:

1. In the plant light supplementing lamp, by providing the adapter at the top of the electronic ballast, providing structures such as the sliding grooves on the side surfaces and providing the guide blocks at the bottom of the lamp support, the guide blocks can slide in the sliding grooves and the lamp support can be slidably connected with the adapter; by providing the hole structures in the side surfaces of the lamp shade and the adapter, and mounting the elastic member and the stop pin inside, the fixation of the lamp support and the adapter is realized, the quick mounting and dismounting are facilitated, the repair efficiency is improved, and separate packaging for delivery is facilitated.

2. In the plant light supplementing lamp, by mounting the electrical elements in the adapter and leading out the male wiring terminal, the male wiring terminal can be in contact with the female wiring terminal on the bottom surface of the lamp holder when the lamp support is fixedly clamped with the adapter, thus internal power supply is realized, the cable is prevented from being damaged since the cable is externally provided, and the service life of the apparatus is prolonged.

3. In the plant light supplementing lamp, by adopting separately opened molds to manufacture parts, the batch production is more greatly facilitated, the labor cost is reduced, and the assembling time is shortened.

4. In the plant light supplementing lamp, by providing the waterproof pad at the junction of the structure, the waterproof effect of the apparatus is better and the sealing cost is reduced compared with the traditional sealing structure.

In the drawings, 1: electronic ballast; 101: limiting plate; 102: T-shaped clamping block; 2: mounting bracket; 3: lamp support; 301: guide block; 302: limiting hole; 303: wiring outlet; 304: limiting rod; 4: lamp holder; 5: lamp shade; 6: adapter; 601: clamping groove; 602: sliding groove; 603: fixing hole; 604: limiting slot; 7: elastic member; 8: stop pin; 9: male wiring terminal; 10: first electrical module; 11: guide bar; 12: second electrical module; 13: female wiring terminal; 14: guide groove; 15: four vertical plates; 16: U-shaped radiating fin; 17: bottom plate; 18: radiating fin.

DETAILED DESCRIPTION OF THE EMBODIMENTS

The technical solutions in the embodiments of the present invention will be clearly and completely described below with reference to the drawings in the embodiments of the present invention. Apparently, the described embodiments are only a part of the embodiments of the present invention instead of all the embodiments. Based on the embodiments of the present invention, all other embodiments obtained by those skilled in the art without contributing any inventive labor should fall within the scope of protection of the present invention.

Embodiment 1

Provided is a plant light supplementing lamp. Referring to FIG. 1 to FIG. 6, the plant light supplementing lamp includes an electronic ballast 1 and a lamp support 3, and further includes lamp holders 4 connected with the lamp support 3 and a lamp shade 5 connected with the lamp holders 4, the lamp holders 4 are provided in the lamp support 3, the number of the lamp holders 4 is two, the two lamp holders 4 are respectively located at a top and a bottom of the lamp shade 5, an adapter 6 connected with the electronic ballast 1 is provided above the electronic ballast 1, a top of the adapter 6 is movably clamped with a bottom of the lamp support 3, a fixing hole 603 is provided in a rear end of a side surface of the adapter 6, an elastic member 7 penetrating through the fixing hole 603 is provided in the fixing hole 603, a stop pin 8 is fixedly mounted at the end, far away from the adapter 6, of the elastic member 7, the total length of the elastic member 7 and the stop pin 8 is greater than the depth of the fixing hole 603, a limiting hole 302 is provided in left and right side surfaces of the bottom of the lamp support 3, the stop pin 8 is provided in the limiting hole 302 in a penetrating manner, guide blocks 301 extending from front to rear are respectively provided on left and right inner side surfaces of the bottom of the lamp support 3, sliding grooves 602 extending from front to rear are provided in left and right outer side surfaces of the adapter 6, and the guide blocks 301 are located in the sliding grooves 602.

The thickness of the guide blocks 301 is the same as the height of the sliding grooves 602, the length of the guide blocks 301 is adapted to the length of the sliding grooves 602, the diameter of the limiting hole 302 is the same the diameter of the stop pin 8, and the limiting hole 302 penetrates through inner and outer side surfaces of the bottom of the lamp support 3.

Limiting plates 101 extending from front to rear are provided on an upper end surface of the electronic ballast 1, the limiting plates 101 are provided perpendicular to the upper end surface of the electronic ballast, the number of the limiting plates 101 is two, and the limiting plates 101 are symmetrically distributed in a left-right direction on the upper end surface of the electronic ballast 1. A T-shaped clamping block 102 is fixedly mounted on the inner side surface of each limiting plate 101, the material of the T-shaped clamping block 102 is the same as the material of the limiting plate 101, the T-shaped clamping blocks 102 and the limiting plates 101 are in an integral structure, and clamping grooves 601 adapted to the T-shaped clamping blocks 102 are respectively provided in left and right side surfaces of the adapter 6.

The clamping grooves 601 are in interference fit with the T-shaped clamping blocks 102, and the clamping grooves 601 penetrate through an upper end surface and a lower end surface of the adapter from top to bottom. The sliding grooves 602 are located at a middle-upper position of the side surface of the adapter 6, upper end surfaces of the limiting plates 101 are in flush with upper end surfaces of the T-shaped clamping blocks 102, the sliding grooves 602 are located above the limiting plates 101, and rear ends of the sliding grooves 602 penetrate to a rear side surface of the adapter 6.

Limiting slots 604 are provided in a bottom of a back surface of the adapter 6, the number of the limiting slots 604 is two, the limiting slots 604 are symmetrically distributed in a left-right direction in a rear side surface of the adapter 6, a limiting rod 304 is fixedly provided on an inner rear side surface of a lower end of the lamp support 3, the limiting rod 304 is adapted to the limiting slots 604 and is provided in the limiting slots 604 in a penetrating manner, and the limiting rod 304 is capable of stretching into the limiting slots 604 to realize auxiliary fixation.

Figure 1:
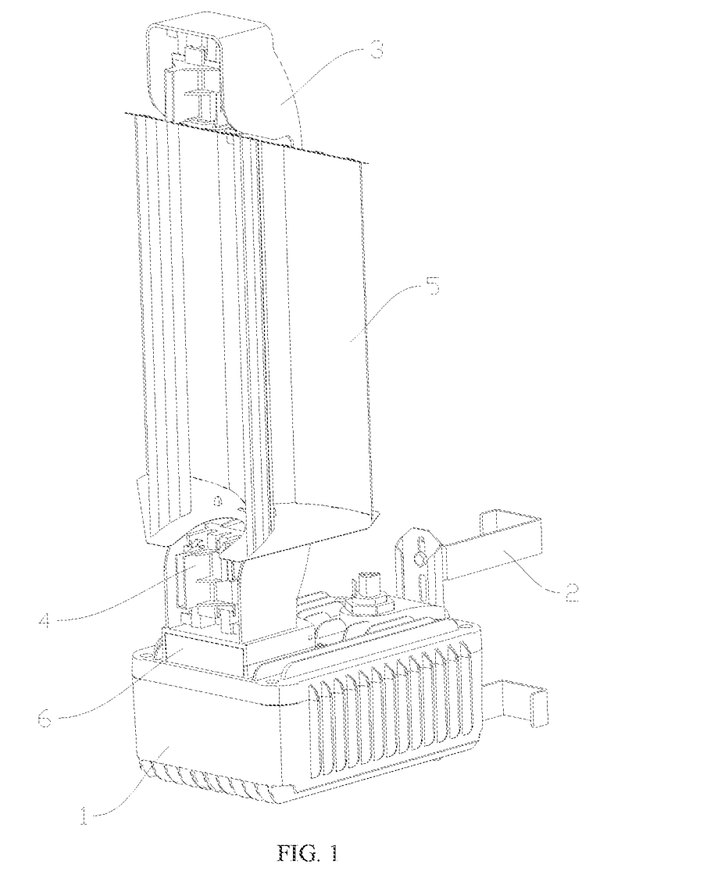
FIG. 1 is a schematic view of a structure according to the present invention.
Figure 2:
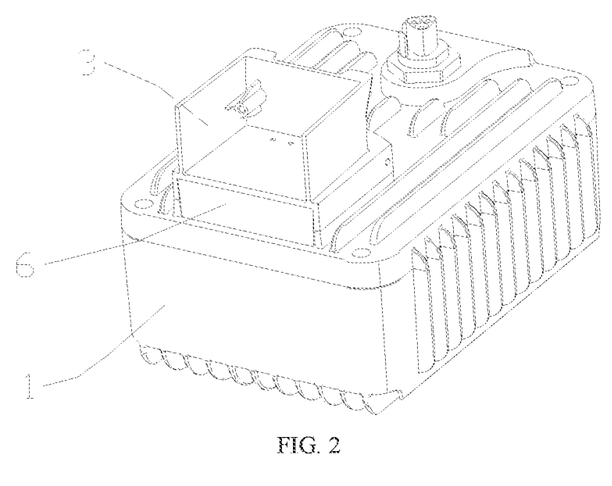
FIG. 2 is a schematic view of an electronic ballast structure of a structure according to the present invention.
Figure 3:
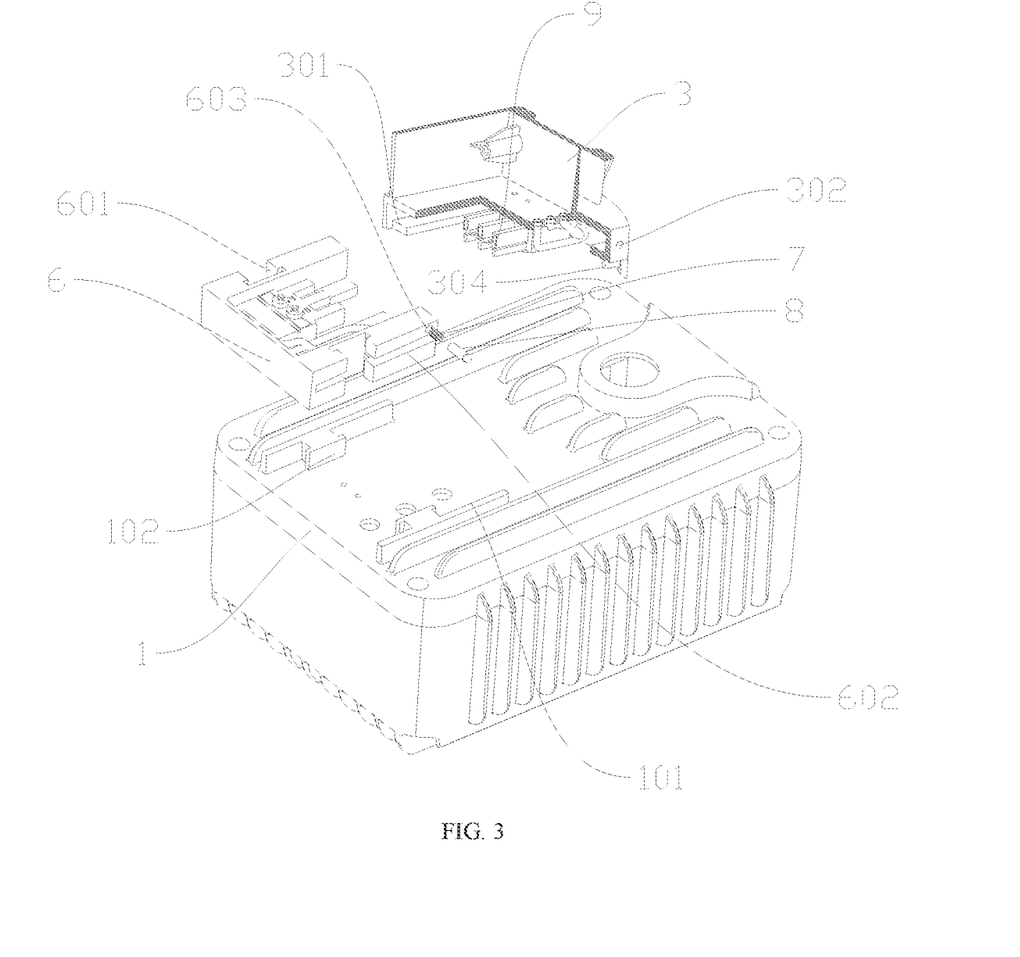
FIG. 3 is an exploded schematic view of a connection structure of an electronic ballast of a structure according to the present invention.
Figure 4:
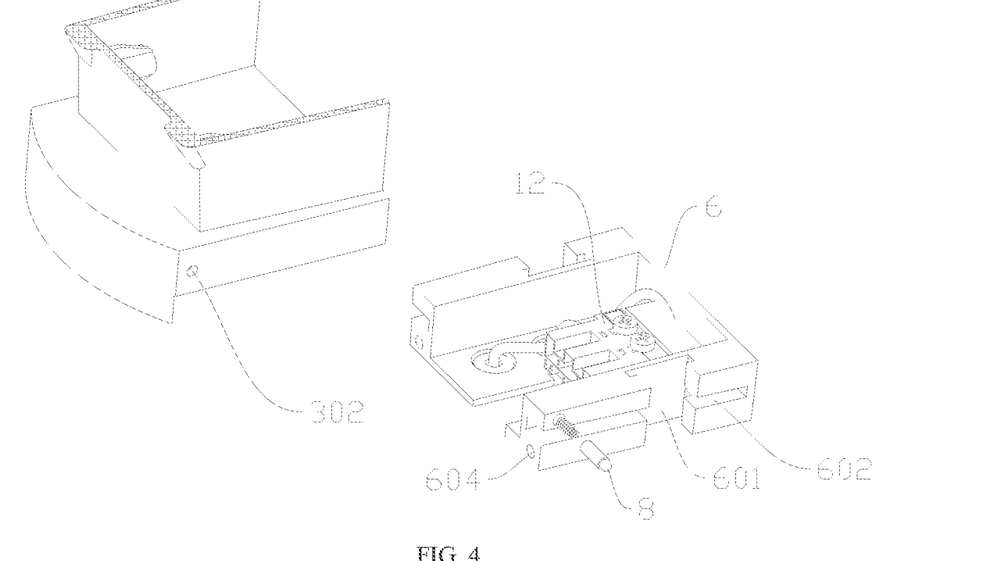
FIG. 4 is an exploded schematic view of a clamping structure of a lamp shade of a structure according to the present invention.
Figure 5:
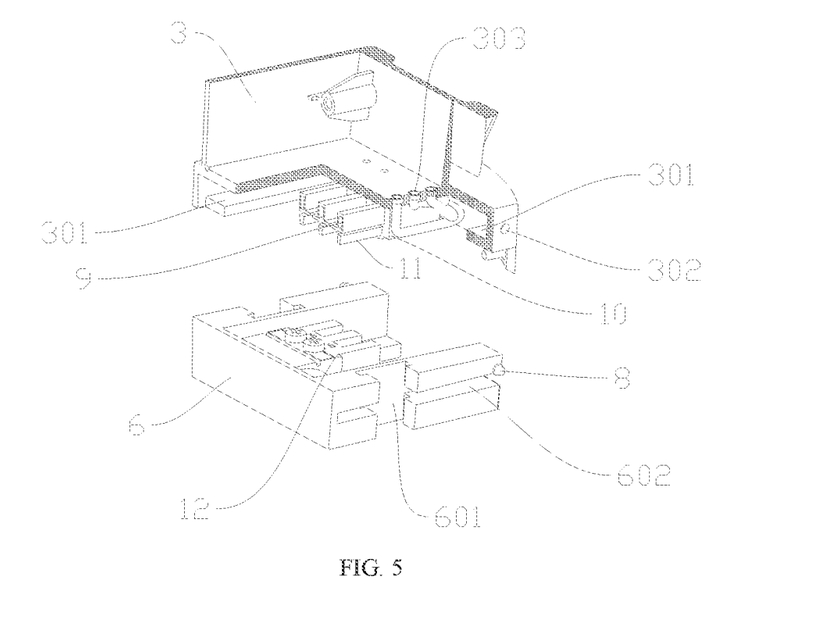
FIG. 5 is an exploded schematic view of a male wiring terminal structure of a structure according to the present invention.
Figure 6:
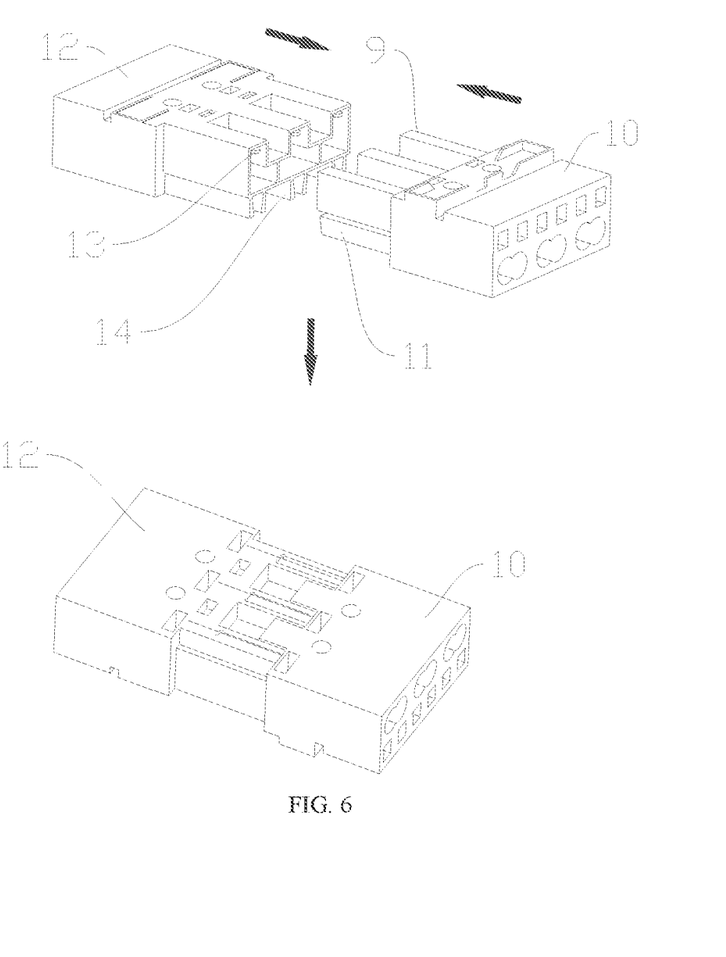
FIG. 6 is a schematic view of mounting a power supply wiring terminal of a structure according to the present invention.
Figure 7:
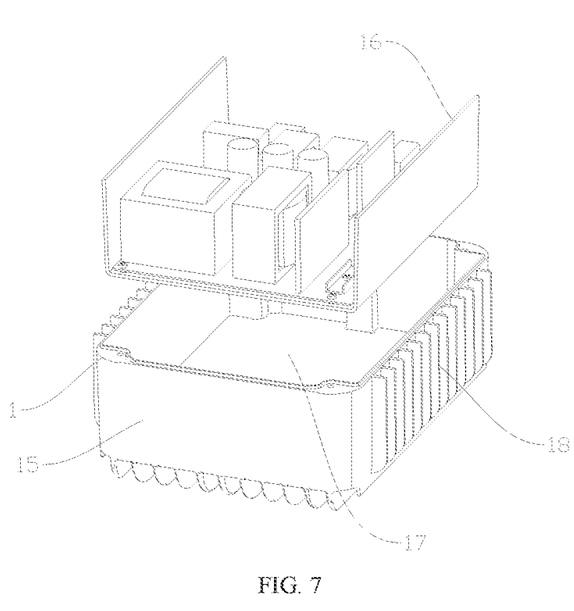
FIG. 7 is an exploded schematic view of an electronic ballast and a U-shaped radiating fin according to the present invention.

Sidewalls of the electronic ballast 1 consist of four vertical plates 15 which form an integral structure, a bottom plate 17 connected with the four vertical plates 15 are provided below the four vertical plates 15, the bottom plate and the four vertical plates 15 are integrally formed through injection molding, a U-shaped radiating fin 16 for mounting electronic devices is provided in the electronic ballast 1, the U-shaped radiating fin 16 is fixedly mounted in the electronic ballast 1, an outer side surface of the U-shaped radiating fin 16 is in close contact with an inner side surface of the electronic ballast 1, and radiating fins 18 are respectively and uniformly provided on a left side surface, a right side surface and a lower end surface of the electronic ballast 1.

Embodiment 2

Provided is a plant light supplementing lamp. Referring to FIG. 1 to FIG. 6, a first electrical module 10 is provided in a lower end of the lamp support 3, a male wiring terminal 9 is fixedly mounted at an output end of the first electrical module 10, a guide bar 11 is provided below the male wiring terminal 9, a wiring outlet 303 is provided in the bottom of the lamp support 3, the male wiring terminal 9 is connected with the lamp holders 4 through wiring via the wiring outlet to realize power supply for lamp tubes in the lamp shade 5, the wiring outlet 303 penetrates through the bottom of the lamp support 3, a second electrical module 12 mounted in the adapter 6 is provided in the adapter 6, a female wiring terminal 13 adapted to the male wiring terminal 9 is fixedly mounted at an output end of the second electrical module 12, and a guide groove 14 adapted to the guide bar 11 is provided below the female wiring terminal 13.

The working principle is as follows: when it is necessary to dismount, the stop pin 8 is pressed towards the inner side to make the elastic member 7 shrink and contact the fixation of the adapter 6 and the lamp support 3, the lamp support 3 is pulled towards the rear side to separate the limiting rod 304 from the limiting slot 604, the guide blocks 301 are put out along the sliding grooves 602, and then the adapter 6 is upwards pulled out to realize dismounting; when it is necessary to mount, the clamping grooves 601 are aligned with the T-shaped clamping blocks 102 and are pressed downwards, the guide blocks 301 are aligned with the sliding grooves 602, the lamp support 3 is pulled towards the front side to insert the limiting rod 304 into the limiting slot 604, and at the same time the stop pin 8 is enabled to penetrate into the limiting hole 302 under the push of the elastic member 7 to realize fixation. At this time, the male wiring terminal 9 is electrically clamped with the female wiring terminal 13 in the adapter 6 to realize powering-on.

Although the embodiments of the present invention have been illustrated and described, it can be understood by those skilled in the art that a variety of changes, modifications, replacements and modifications may be made to these embodiments without departing from the principle and spirit of the present invention, and the scope of the present invention is defined by the attached claims and equivalents thereof.

What is claimed is:

1. A plant light supplementing lamp, comprising an electronic ballast and a lamp support, wherein
    an adapter connected with the electronic ballast is provided above the electronic ballast,
    a top of the adapter is movably clamped with a bottom of the lamp support,
    a fixing hole is provided in a rear end of a side surface of the adapter,
    an elastic member penetrating through the fixing hole is provided in the fixing hole,
    a stop pin is fixedly mounted at an end, away from the adapter, of the elastic member,
    a total length of the elastic member and the stop pin is greater than a depth of the fixing hole,
    a limiting hole is provided in left and right side surfaces of the bottom of the lamp support,
    the stop pin is provided in the limiting hole in a penetrating manner,
    guide blocks extending from front to rear are respectively provided on left and right inner side surfaces of the bottom of the lamp support,
    sliding grooves extending from front to rear are provided in left and right outer side surfaces of the adapter, and the guide blocks are located in the sliding grooves.

2. The plant light supplementing lamp according to claim 1, wherein limiting plates extending from front to rear are provided on an upper end surface of the electronic ballast, the limiting plates are provided perpendicular to the upper end surface of the electronic ballast, a number of the limiting plates is two, and the limiting plates are symmetrically distributed in a left-right direction on the upper end surface of the electronic ballast.

3. The plant light supplementing lamp according to claim 2, wherein a T-shaped clamping block is fixedly mounted on an inner side surface of each limiting plate, a material of the I-shaped clamping block is identical to a material of the limiting plate, and clamping grooves adapted to T-shaped clamping blocks are respectively provided in left and right side surfaces of the adapter.

4. The plant light supplementing lamp according to claim 3, wherein the clamping grooves are in an interference fit with the T-shaped clamping blocks, and the clamping grooves penetrate through an upper end surface and a lower end surface of the adapter from top to bottom.

5. The plant light supplementing lamp according to claim 3, wherein the sliding grooves are located at a middle-upper position of the side surface of the adapter, upper end surfaces of the limiting plates are in flush with upper end surfaces of the T-shaped clamping blocks, the sliding grooves are located above the limiting plates, and rear ends of the sliding grooves penetrate to a rear side surface of the adapter.

6. The plant light supplementing lamp according to claim 1, wherein a thickness of the guide blocks is identical to a height of the sliding grooves, a length of the guide blocks is adapted to a length of the sliding grooves, a diameter of the limiting hole is identical to a diameter of the stop pin, and the limiting hole penetrates through inner and outer side surfaces of the bottom of the lamp support.

7. The plant light supplementing lamp according to claim 1, wherein limiting slots are provided in a bottom of a back surface of the adapter, a number of the limiting slots is two, the limiting slots are symmetrically distributed in a left-right direction in a rear side surface of the adapter, a limiting rod is fixedly provided on an inner rear side surface of a lower end of the lamp support, and the limiting rod is adapted to the limiting slots and is provided in the limiting slots in a penetrating manner.

8. The plant light supplementing lamp according to claim 1, wherein a first electrical module is provided in a lower end of the lamp support, a male wiring terminal is fixedly mounted at an output end of the first electrical module, a guide bar is provided below the male wiring terminal, a wiring outlet is provided in the bottom of the lamp support, the wiring outlet penetrates through the bottom of the lamp support, a second electrical module mounted in the adapter is provided in the adapter, a female wiring terminal adapted to the male wiring terminal is fixedly mounted at an output end of the second electrical module, and a guide groove adapted to the guide bar is provided below the female wiring terminal.

9. The plant light supplementing lamp according to claim 1, further comprising lamp holders connected with the lamp support and a lamp shade connected with the lamp holders, wherein
    the lamp holders are provided in the lamp support, a number of the lamp holders is two, and the two lamp holders are respectively located at a top and a bottom of the lamp shade.

10. The plant light supplementing lamp according to claim 1, wherein sidewalls of the electronic ballast consist of four vertical plates, wherein the four vertical plates form an integral structure, a U-shaped radiating fin for mounting electronic devices is provided in the electronic ballast, the U-shaped radiating fin is fixedly mounted in the electronic ballast, and an outer side surface of the U-shaped radiating fin is in close contact with an inner side surface of the electronic ballast.

\* \* \* \* \*